Oct. 20, 1959 C. G. P. AURELL 2,909,657

DEVICE FOR INDICATING THE PRESENCE OF A PULSE GROUP
WITH CERTAIN DETERMINED TIME INTERVALS
BETWEEN THE PULSES INCLUDED THEREIN

Filed Feb. 21, 1955

INVENTOR
CARL GEORG PAUL AURELL

BY [signature]
ATTORNEY

United States Patent Office 2,909,657

Patented Oct. 20, 1959

2,909,657

DEVICE FOR INDICATING THE PRESENCE OF A PULSE GROUP WITH CERTAIN DETERMINED TIME INTERVALS BETWEEN THE PULSES INCLUDED THEREIN

Carl Georg Paul Aurell, Stockholm, Sweden, assignor to Telefonaktiebolaget L M Ericsson, Stockholm, Sweden, a corporation of Sweden Application February 21, 1955, Serial No. 489,657

Claims priority, application Sweden February 26, 1954

3 Claims. (Cl. 250—27)

The present invention relates to a device for indicating the presence of a pulse group with certain determined time intervals between the pulses included therein, this device comprising a time delay device of any kind, for instance a delay network.

Figure 1:
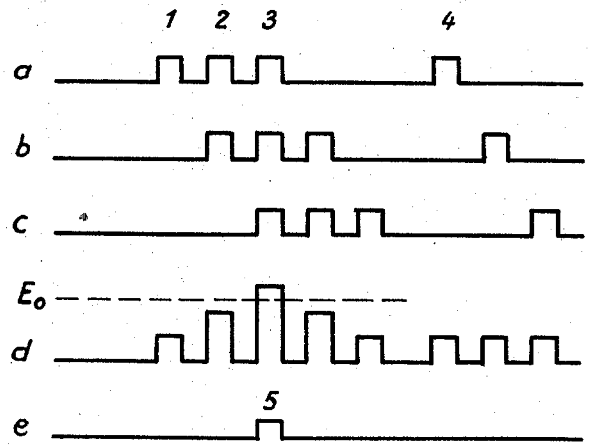

It is previously known to use a delay network in such a device, and Fig. 1 on the drawing shows the principle for the operating manner of such a device previously known. A pulse train is fed to the device, said pulse train comprising i.a. also three pulses 1, 2 and 3 with determined time intervals between themselves and another pulse 4 (see Fig. 1*a*), whereby this pulse train is delayed in two different stages in said delay network (see Figs. 1*b* and 1*c*). After this said three pulse trains, mutually time displaced, are summed up so that a resulting pulse train is obtained. This pulse train is then fed to a limiter, which lets pass only voltages exceeding a certain level, $E_0$ (Fig. 1*d*), a pulse 5 according to Fig. 1*e* being obtained as a final result, said pulse thus indicating that a certain determined pulse group has occurred. A device operating according to the above mentioned principle has, however, the disadvantage, that it is rather sensitive to variations of the voltage, as well respecting the voltage level $E_0$ as the amplitude of the particular pulses.

The above mentioned disadvantages will be completely eliminated by the present invention, and the invention is mainly characterized by a number of cascade-connected valve-devices being connected to time delay devices in points, between which the time delay is equal to the time intervals between the pulses comprised in said pulse group, said pulses being fed to the delay device and then actuating each its valve, so that, when said pulse group occurs, all valves are conductive and let a signal pass to the output of the device as an indication of the presence of said pulse group.

Figure 2:
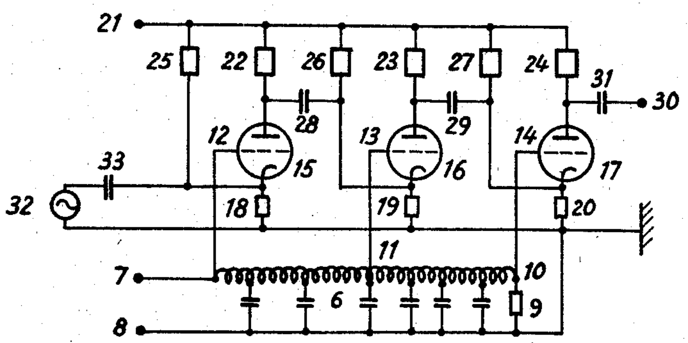
Figure 3:
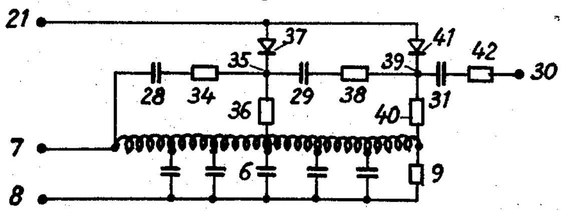

The invention will be more closely described in connection with the attached drawing, where Fig. 1 shows the previously described principle of the operating manner of a previously known device, and Figs. 2 and 3 show some different embodiments of a device according to the invention.

In Fig. 2, 6 indicates a delay network, the input terminals of which are designated by 7 and 8, the latter of which is earthed. The delay network is ended by a matching resistance 9 between the output terminals 10 and 8 of the network. 11 designates a point on the delay network between the terminals 7 and 10. The time delay between the points 11 and 10 is equal to the time interval between the leading edges of the first and the second pulses in the pulse group, the presence of which is to be indicated by the device, and the time delay between the points 7 and 11 is equal to the time interval between the leading edges of the second and the third pulses in said pulse group. It is presupposed that the pulse group comprises three pulses, but the device may easily be provided with pulse groups comprising more pulses. The points 7, 11 and 10 are connected to the respective control grids 12, 13 and 14 each in its electron tube 15, 16 and 17, the cathodes of which are connected to earth over separate cathode resistances 18, 19 and 20, respectively, the anodes of the tubes being connected to an anode voltage source 21 over separate anode resistances 22, 23 and 24, respectively. The cathodes of the tubes are connected to the anode voltage source 21 over separate resistances 25, 26 and 27, respectively. The anode of the tube 15 is connected to the cathode of the tube 16 over a connecting condenser 28, and the anode of the tube 16 is similarly connected to the cathode of the tube 17 over a connecting condenser 29. The output terminals of the device are earth 8 and the terminal 30, this latter terminal being connected to the anode of the tube 17 over a condenser 31. A generator 32 is connected both to earth and to the cathode of the tube 15 over a condenser 33.

The device operates in the following manner: A pulse train is fed to the input terminals 7 and 8 of the delay network, said pulse train comprising the pulse group the presence of which is to be indicated by the device. The pulse train may for instance have a shape according to Fig. 1*a*, and it should consist of positive pulses. The cathode current of the electron tubes 15, 16 and 17 is normally blocked because the control grids have earth potential, and the cathodes have a positive potential high enough in relation to earth. A current from the positive voltage source 21 flows through the cathode resistance 18 of the electron tube 15 over the resistance 25, and the corresponding takes place in the cathode resistances of the other tubes. The current through a cathode resistance of a tube is so high, that anode current can occur only if a voltage of negative polarity is fed to the cathode of the tube at the same time as a voltage of positive polarity is fed to the control grid of the tube. The electron tubes 15, 16 and 17 may be regarded as valves, which are connected to the delay network 6 in such points, in which the time delay is equal to the time intervals between the pulses in the pulse group in question. The pulses are fed to the delay network and over this they actuate the valves, but only when positive pulses are to be found at the same time in the points 7, 11 and 10, a signal from the generator 32 can pass through all cascade-connected valves to the output 30 of the device.

The generator 32 and the condenser 33 are not always necessary. If they are omitted, and instead the resistance 25 is made so high that the voltage of the cathode in the tube 15 is decreased sufficiently for a positive pulse on the control grid to be able to make the tube conductive, the same effect as before is obtained. A negative pulse will then occur on the anode of the tube 15 and will give sufficient voltage to the cathode of the tube 16 etc., and a signal is finally obtained at the output 30 of the device.

The device may naturally also be executed in such a way, that it can distinguish pulse groups comprising a large or small number of pulses. By connecting other lengths of the delay network between the respective valve devices it is possible to distinguish pulse groups with other fixed time intervals between the pulses.

Fig. 3 shows another device according to the invention. The device comprises a delay network 6, the input terminals of which are designated by 7 and 8 and the output terminals of which are designated by 10 and 8. The terminal 7 is over a condenser 28 in series with a resistance 34 connected to a point 35, which is over a resistance 36 connected to a point 11 in the delay network. The point 35 is connected to the cathode of a diode 37, the anode of which is connected to a positive voltage source 21. The point 35 is also over a condenser 29 in series with a resistance 38 connected to a point 39, which is connected to the output terminal 10 of the delay network over a resistance 40. The point 39 is connected to the cathode of a diode 41, the anode of which is connected to the positive voltage source 21. The point 39 is also connected to point 30 over a condenser 31 in series with a resistance 42.

The device operates in the following manner: A pulse train is fed to the input terminals of the delay network, said pulse train comprising i.a. the pulse group the presence of which is to be indicated by the device. The pulse train may for instance have a shape according to Fig. 1*a* and should consist of pulses with positive polarity. The diodes 37 and 41 are normally conductive, a current flowing from the voltage source 21 over the respective diodes and the resistances 36 and 40, respectively, and the common resistance 9 to earth 8. The potential of the voltage source 21 is ½–1 time the amplitude of the input pulses and preferably a little more than half said amplitude. The resistances 34 and 38 are considerably greater than the resistance of the diodes 37 and 41, when these are conductive, but considerably smaller than the resistance of the diodes, when these are blocked. The resistance 34 may be considered as the series branch and the diode 37 as the shunt branch in an L-link, the attenuation of which is great, when the diode 37 is conductive, but small, when the diode 37 is blocked. In the same way the resistance 38 may be considered as the series branch and the diode 41 as the shunt branch in another L-link, the attenuation of which is great, when the diode 41 is conductive, but small when the diode 41 is blocked. The potential of the voltage source 21 is so chosen that the two diodes 37 and 41 are blocked at the same time, only if pulses of positive polarity occur at the same time in all three points 7, 11 and 10. Thus, only if pulses of positive polarity occur at the same time in the points 11 and 10, a pulse occuring at the same time in point 7 may pass said two cascade-connected L-links to the output 30 of the device without considerable attenuation. The two L-links may thus be considered as cascade-connected valve devices corresponding to the electron tubes in Fig. 2.

The device according to Fig. 3 can naturally be changed so that it can distinguish pulse groups comprising a large or small number of pulses. By connecting other lengths of the delay network between the respective valve devices, it is possible to distinguish pulse groups with other determined time intervals between the pulses.

By changing the polarity of the diodes 37 and 41 and by using a voltage source 21 of negative instead of positive polarity the device may be used for indicating the presence of certain determined pulse groups in a pulse train with pulses of negative polarity.

I claim:

1. A network system for locating the presence of a group of pulses including pulses spaced by predetermined time intervals, said system comprising a time delay network means having input and output terminals, several attenuating means connected in cascade, each having input and output terminals and including a diode, each of said attenuating means comprising an L-network, the respective diode being included in the shunt branch and a resistance means being included in the series branch of each L-network, said diodes being normally conductive but simultaneously blocked in response to pulses of the same polarity appearing simultaneously at all the output terminals of the time delay network, the attenuation of said L-networks being high when the diodes are conductive and low when the diodes are blocked whereby pulses are passed only when all the diodes are blocked, the input terminals of the network means being connected to the input terminals of the attenuating means and the output terminals of the network being each connected to the diode of a respective attenuating means, and a bias source connected in circuit with said diodes for imparting to the same a bias such as to cause a high attenuation by the attenuating means in the absence of pulses belonging to a group of pulses to be located at the input terminals of the network means.

2. A network system according to claim 1, wherein said time delay network means have a number of output teminals equal to the number of pulses in the pulse group to be located, and the time delay between each two associated output terminals is equal to the time interval between corresponding two pulses of the group.

3. A network system according to claim 1, wherein the resistance of said resistance means is higher than that of the diodes when the latter are conductive but lower when the diodes are blocked.

References Cited in the file of this patent

UNITED STATES PATENTS

| | | |
|---|---|---|
| 2,415,359 | Loughlin | Feb. 4, 1947 |
| 2,437,313 | Bedford | Mar. 9, 1948 |
| 2,535,303 | Lewis | Dec. 26, 1950 |
| 2,577,141 | Mauchly et al. | Dec. 4, 1951 |
| 2,736,801 | Wiegand et al. | Feb. 28, 1956 |
| 2,800,584 | Blake | July 23, 1957 |

FOREIGN PATENTS

| | | |
|---|---|---|
| 279,487 | Switzerland | Mar. 17, 1952 |